United States Patent [19]
Tanaka et al.

[11] Patent Number: 5,161,066
[45] Date of Patent: Nov. 3, 1992

[54] ENGAGING MECHANISM OF ROLLER AND GUIDE GROOVE IN OPTICAL ELEMENT

[75] Inventors: Hitoshi Tanaka; Katsumori Kikuchi, both of Tokyo, Japan

[73] Assignee: Asahi Kogaku Kogyo Kabushiki Kaisha, Tokyo, Japan

[21] Appl. No.: 627,839

[22] Filed: Dec. 17, 1990

[30] Foreign Application Priority Data

Dec. 25, 1989 [JP] Japan .................. 1-147763[U]

[51] Int. Cl.⁵ .................................................. G02B 15/00
[52] U.S. Cl. ............................................ 359/823; 359/694
[58] Field of Search ............... 359/694, 811, 819, 823

[56] References Cited

U.S. PATENT DOCUMENTS

| | | | |
|---|---|---|---|
| 4,272,160 | 6/1981 | Uesugi | 359/823 |
| 4,324,457 | 4/1982 | Tomori | 359/693 |
| 4,346,967 | 8/1982 | Komoto et al. | 359/693 |
| 4,380,378 | 4/1983 | Tamura | 359/694 |
| 4,506,959 | 3/1985 | Hama | 359/693 |
| 4,910,544 | 3/1990 | Nomura | 354/195.12 |

FOREIGN PATENT DOCUMENTS

| | | |
|---|---|---|
| 64-004082 | 2/1989 | Japan . |
| 1-19440 | 2/1989 | Japan . |
| 1-133014 | 5/1989 | Japan . |

*Primary Examiner*—Loha Ben
*Attorney, Agent, or Firm*—Sandler, Greenblum & Bernstein

[57] ABSTRACT

An engaging mechanism of a stepped guide groove having an inner narrow groove portion and an outer wide groove portion and a roller which is provided with an outer larger diameter portion which is fitted in the outer wide groove portion and an inner small diameter portion which is fitted in the inner groove portion with a clearance therebetween so as not to come into contact with the wall surface of the inner narrow groove portion.

14 Claims, 3 Drawing Sheets

ENGAGING MECHANISM OF ROLLER AND GUIDE GROOVE IN OPTICAL ELEMENT

BACKGFROUND OF THE INVENTION

1. Field of the Invention

The present invention relates to an engaging mechanism of a roller and a guide groove in which the roller is movably fitted in an optical element, such as a lens barrel.

2. DESCRIPTION OF THE RELATED ART

For example, a zoom lens barrel has a variable power lens group (movable member) which is movable in an optical axis direction and a rotatable cam ring (guide ring) having a cam groove (guide groove). The variable power lens group has a roller which is engaged by the cam groove of the cam ring. When the cam ring is rotated, the variable power lens group is moved in the optical axis direction along the cam profile of the cam groove to effect the zooming operation.

FIGS. 5 and 6 show a known engaging mechanism of a guide groove 12 formed in a guide ring 11 and a roller 14 which is secured to a movable member 13 to be engaged in the guide groove 12. The guide groove 12 has a width which is slightly larger than the outer diameter of the roller 14 to minimize a clearance therebetween.

The guide ring 11 is usually coated at its inner surface with an anti-reflective coating (a matte paint) 15 which prevents the internal reflection after the guide groove 12 is formed. The anti-reflective coating 15 which has a certain film thickness partially spreads over the wall surface of the guide groove 12, as shown in FIG. 5 in which the thickness of the coating 15 is exaggerated. The roller 14 is inserted in the guide groove 12 which is partially coated with the anti-reflective coating 15 and comes into contact with the coated wall surface of the guide groove 12.

However, the coating layer 15 reduces the width of the guide groove 12, resulting in no smooth slide movement of the roller 14 in the guide groove 12. To prevent this, a larger clearance must be provided between the roller 14 and the guide groove 12. Furthermore, since the anti-reflective coating 15 is usually not lubricative, the application of the anti-reflective coating onto the inner wall surface of the guide groove 12 is not preferable. The anti-reflective coating 15 stuck to the inner wall surface of the guide groove 12 may be scraped by the roller 14 during the slide contact of the roller 14 with the inner wall surface of the guide groove 12. However, there is a large possibility that the necessary anti-reflective coating 15 applied onto the inner surface of the guide ring 11 is partially stripped off together with the anti-reflective coating 15 stuck to the inner wall surface of the guide groove 12 especially in the vicinity of the guide groove 12 when the anti-reflective coating 15 of the guide groove 12 is scraped or stripped. This results in a deteriorated anti-reflective effect. To prevent the inner wall surface of the guide groove 12 from being coated with an undesirable anti-reflective coating, upon coating the inner surface of the guide ring 11, it is possible to use a predetermined shape of mask which covers the guide groove 12. This is expensive however.

In addition to the foregoing, if the inner surface of the guide ring 11 and the wall surface of the guide groove 12 are subject to an anti-reflective surface treatment, the wall surface of the guide groove 12 becomes shiny as a result of a repeated slide contact of the roller 14 with the wall surface of the guide groove 12, thus resulting in a decreased anti-reflective effect.

The above discussion can be equally applied to a linear guide groove and to an immovable guide ring.

SUMMARY OF THE INVENTION

The primary object of the present invention is to provide an engaging mechanism of a roller and a guide groove in which the roller is movably fitted, wherein no strip of the anti-reflective coating applied to the inner surface of the guide ring occurs in the vicinity of the guide groove when the roller is inserted in the guide groove.

Another object of the present invention is to provide an engaging mechanism of a roller and a guide groove in which the roller is movably fitted, such that no mask to cover the guide groove is necessary upon coating the inner surface of the guide ring with an anti-reflective coating.

According to the solution of the present invention to the above mentioned drawbacks, the roller does not come into contact with the guide groove at the inner portion thereof.

To achieve the objects mentioned above, in an engaging mechanism in an optical device having an optical element which has a guide groove and a roller which is movably fitted in the guide groove, according to the present invention, the guide groove is a stepped guide groove having an inner narrow groove portion and an outer wide groove portion, and the roller is provided with an outer larger diameter portion which is fitted in the outer wide groove portion of the stepped guide groove and an inner small diameter portion which is fitted in the inner narrow groove portion of the stepped guide groove with a clearance therebetween so as not to come into contact with the wall surface of the inner narrow groove portion.

In an engaging mechanism of a roller and a guide groove in which the roller is movably fitted, as constructed above, since the roller does not come into contact with the wall surface of the inner narrow groove portion of the stepped guide groove due to the clearance therebetween, even if the anti-reflective coating applied to the inner surface of the guide ring partially spreads over the side wall surfaces of the inner narrow groove portion of the guide groove, there is no possibility that the roller cannot smoothly slide in the guide groove. Likewise there is not possibility of stripping or scraping of the anti-reflective coating applied to the inner surface of the guide ring. Furthermore, the inner side wall surface of the stepped guide groove does not become shiny, and no internal reflection resykts thereby. In addition, no mask is required during coating of the inner surface of the guide ring with an anti-reflective coating, since even if the anti-reflective coating is partially applied to the side surfaces of the narrow groove portion of the stepped guide groove, no problem is raised thereby. Furthermore, since the side walls of the wide groove portion of the stepped guide groove is not coated with the anti-reflective coating, the engaging portion between the roller and the wide groove portion is free from the above mentioned drawbacks of the prior art.

The optical element having the stepped guide groove can be either an annular member or a plate member. The guide groove can be either a linear movement guide groove or a non-linear groove (cam groove).

It is possible to provide a second annular member which has a guide groove in which the larger diameter portion of the roller can be fitted.

According to another aspect of the present invention, there is provided a lens barrel guiding apparatus having a lens barrel guide ring which has a guide groove and a movable member which is movable relative to the guide ring and which has a roller which is fitted in the guide groove, wherein the guide groove of the guide ring is a stepped guide groove having an inner narrow groove portion and an outer wide groove portion, the roller being provided with an outer larger diameter portion which is fitted in the outer wide groove portion of the stepped guide groove and an inner small diameter portion which is fitted in the inner narrow groove portion of the stepped guide groove with a clearance therebetween so as not to come into contact with the wall surface of the inner narrow groove portion.

The present disclosure relates to subject matter contained in Japanese utility model application No. 1-147763 (filed on Dec. 25, 1989) which is expressly incorporated herein by reference in its entirety.

BRIEF DESCRIPTION OF THE DRAWINGS

The invention will be described below in detail with reference to the accompanYing drawings, in which.

DESCRIPTION OF THE PREFERRED EMBODIMENTS

Figure 1:
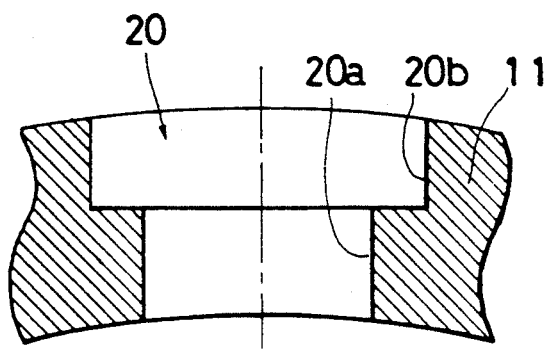
FIG. 1 is a sectional view of a guide ring having a guide groove according to a first embodiment of the present invention.
Figure 2:
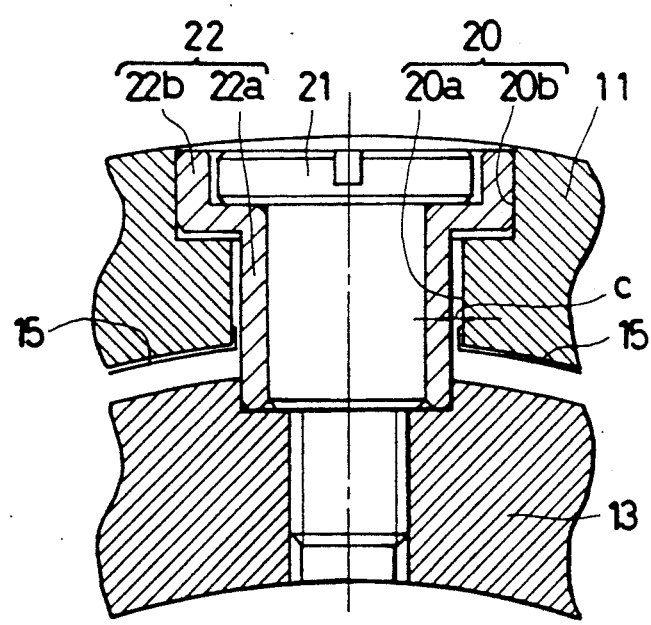
FIG. 2 is a sectional view of a guide ring and a roller of a movable member which is fitted in a guide groove of the guide ring, according to a first embodiment of the present invention.
Figure 5:
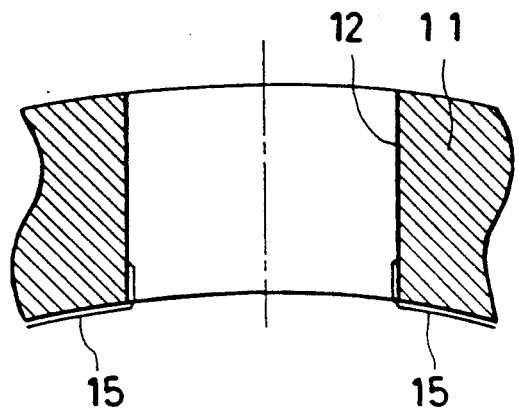
FIG. 5 is a sectional view of a known guide ring having a guide groove.
Figure 6:
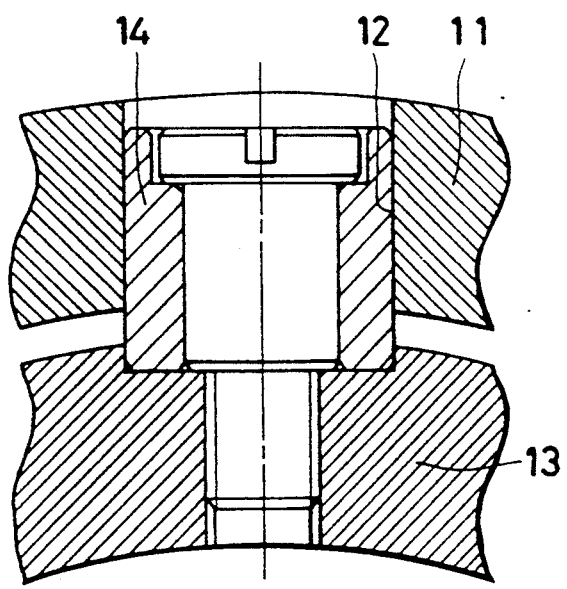
FIG. 6 is a sectional view of a known engaging mechanism of a guide ring and a roller of a movable member which is fitted in a guide groove of the guide ring.

In FIGS. 1 and 2 which show a first embodiment of the present invention, elements corresponding to those shown in FIGS. 5 and 6 mentioned above are designated with the same reference numerals.

The guide ring 11 as an optical element has a stepped guide groove 20 (e.g. non-linear cam groove) consisting of an inner narrow portion 20a and an outer wider portion 20b connected thereto. The inner narrow portion 20a and the outer wider portion 20b can be formed at one time by a stepped cutter (not shown).

The movable member 13 has an annular roller 22 which is rotatably supported thereto by a stepped machine screw 21. The roller 22 has an inner smaller diameter portion 22a corresponding to the narrow portion 20a and an outer large diameter portion 22b corresponding to the wider portion 20b. The diameter of the large diameter portion 22b is such that it can smoothly slide in the corresponding wider groove portion 20b but minimize a clearance between the large diameter portion 22b and the wider groove portion 20b. On the other hand, the diameter of the smaller diameter portion 22a is larger than the width of the narrow groove portion 20a to provide a large clearance c therebetween, so that the smaller diameter portion 22a does not come into contact with the inner wall surface of the narrow groove portion 20a during the movement of the roller 22 in the guide groove 20. The movable member 13 is guided by a guide mechanism (not shown) to move only in the optical axis direction (i.e. the axial direction of the guide ring 11). The guide ring 11 can be for example rotated.

In the engaging mechanism as constructed above, when a relative movement between the guide ring 11 and the movable member 13 takes place, the outer larger diameter portion 22b of the roller 22 comes into slide contact with the side walls of the outer wide groove portion 20b. To the contrary, the inner small diameter portion 22a of the roller 22 does not come into contact with the side walls of the inner narrow groove portion 20a due to the clearance c therebetween. Accordingly, even if the anti-reflective coating 15 which is applied to the inner surface of the guide ring 11 partially spreads over the side wall surfaces of the inner narrow groove portion 20a of the guide groove 20, there is no possibility that for example, the roller 22 can not smoothly slide in the guide groove 20 or that the anti-reflective coating 15 applied to the inner surface of the guide ring 11 is stripped or scraped. Furthermore, once there is no sliding contact of the roller 22 (small diameter portion 22a) with the narrow groove portion 20a the wall surfaces of the stepped guide groove 20 (narrow portion 20a) do not become shiny, thus resulting in no internal reflective thereby. The clearance c is larger than the thickness of the anti-reflective coating 15. These dimensions can be learned for example through experience.

Figure 3:
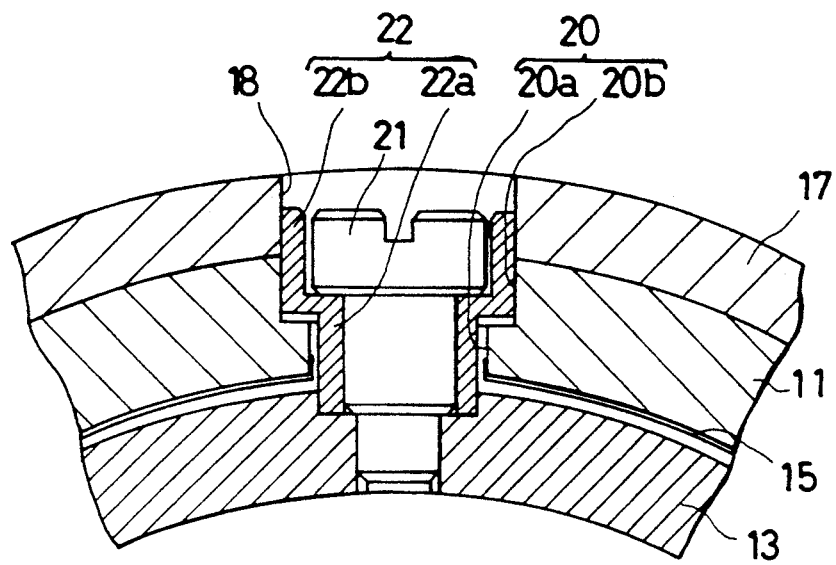
FIG. 3 is a sectional view similar to FIG. 2, according to a second embodiment of the present invention.
Figure 4:
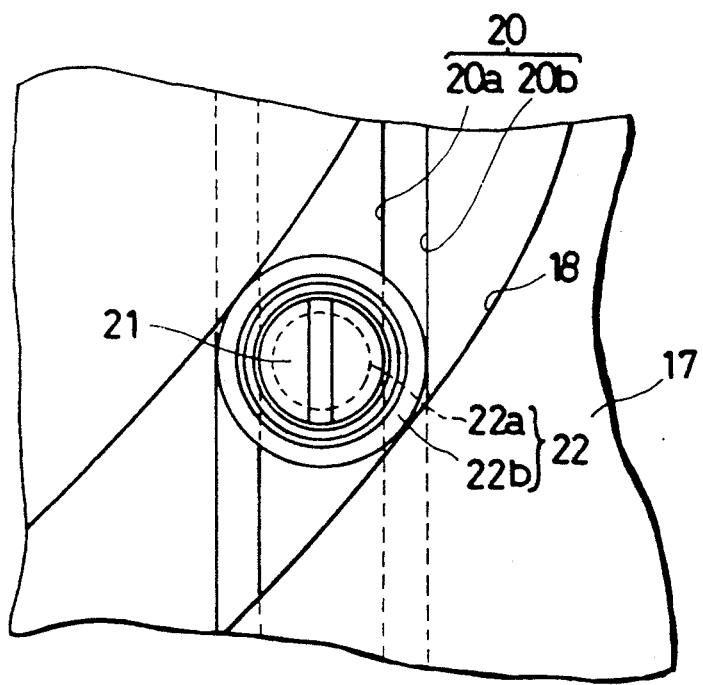
FIG. 4 is a plan view of FIG. 3.

FIGS. 3 and 4 show a second embodiment of the present invention. In this embodiment, the stepped guide groove 20 of the guide ring 11 is a linear groove extending in a direction parallel with the axis of the ring 11. Also, the provision is made to a cam ring 17 in which the guide ring 11 is fitted. The cam ring 17 has a cam groove 18 in which the front end (upper end) of the large diameter portion 22b of the roller 22 is fitted. The width of the cam groove 18 is identical to that of the wide groove portion 20b of the stepped guide groove 20 of the guide ring 11. The direction of the movement of the movable member 13 is restricted by the stepped guide groove 20, so that when the cam ring 17 rotates relative to the guide ring 11, the movable member 13 can move in the optical axis direction in accordance with the cam profile of the cam groove 18. The other construction of the second embodiment is substantially the same as that of the first embodiment. The elements of the second embodiment corresponding to those in the first embodiment are designated with the same reference numerals as those in the first embodiment.

The engaging mechanism in the second embodiment operates similar to the first embodiment.

Although the roller 22 is set to the movable member 13 by the separate stepped machine screws 21 in the illustrated embodiments mentioned above, the roller can be formed integrally with the stepped machine screw 21.

The term "roller" referred to in the present application includes not only a rotatable roller but also a non-rotatable roller.

We claim:

1. In an optical device having an optical element which has a guide groove and a roller which is movably fitted in the guide groove, wherein the provision is made to an engaging mechanism of the roller and the guide groove in which said guide groove is a stepped guide groove having an inner narrow groove portion and an outer wide groove portion, said roller being provided with an outer larger diameter portion which is fitted in the outer wide groove portion of the stepped guide groove and an inner small diameter portion which is fitted in the inner narrow groove portion of the stepped guide groove with a clearance therebetween so as not to come into contact with the wall surface of the inner narrow groove portion.

2. An engaging mechanism according to claim 1, wherein said optical element is coated at its inner surface with an anti-reflective coating.

3. An engaging mechanism according to claim 2, wherein the clearance between the inner small diameter portion of said roller and said inner narrow groove portion of the stepped guide groove is larger than the thickness of said anti-reflective coating applied to said inner surface of said optical element.

4. An engaging mechanism according to claim 3, wherein said optical element is a first annular member.

5. An engaging mechanism according to claim 4, further comprising a second annular member which surrounds said first annular member to relatively rotate.

6. An engaging mechanism according to claim 5, wherein said second annular member is provided with a guide groove which has a profile different from that of the stepped guide groove of said first annular member.

7. An engaging mechanism according to claim 6, wherien said outer larger diameter portion of said roller is fitted in both said outer wide groove portion of said stepped groove of said first annular member and said guide groove of said second annular member.

8. An engaging mechanism according to claim 7, wherein the stepped guide groove of said first annular member is a linear groove extending in a direction parallel with the axis of the first annular member and said guide groove of the second annular member is a non-linear cam groove.

9. An engaging mechanism according to claim 8, further comprising a movable member which is movable in the axial direction in accordance with said linear guide groove of said first annular member, said roller being secured to said movable member.

10. An engaging mechanism according to claim 9, wherein said roller is a rotatable roller.

11. A lens barrel guiding apparatus having a lens barrel guide ring which has a guide groove and a movable member which is movable relative to the guide ring and which has a roller which is fitted in the guide groove, wherein said guide groove of the guide ring is a stepped guide groove having an inner narrow groove portion and an outer wide groove portion, said roller being provided with an outer larger diameter portion which is fitted in the outer wide groove portion of the stepped guide groove and an inner small diameter portion which is fitted in the inner narrow groove portion of the stepped guide groove with a clearance therebetween so as not to come into contact with the wall surface of the inner narrow groove portion.

12. A lens barrel guiding apparatus according to claim 11, further comprising a cam ring which surrounds said guide ring to relatively rotate, said cam ring being provided with a cam groove having a cam profile different from a profile of said stepped guide groove of said guide ring.

13. A lens barrel guiding apparatus according to claim 12, wherein said outer larger diameter portion of said roller is fitted also in said cam groove of said cam ring.

14. A lens barrel guiding apparatus according to claim 13, wherein said stepped guide groove of said guide ring is a linear groove extending in a direction parallel with the axis thereof.

* * * * *

UNITED STATES PATENT AND TRADEMARK OFFICE
CERTIFICATE OF CORRECTION

PATENT NO. : 5,161,066
DATED : November 3, 1992
INVENTOR(S) : Hitoshi TANAKA et al.

It is certified that error appears in the above-indentified patent and that said Letters Patent is hereby corrected as shown below:

At column 5, line 36 (claim 8, line 2), change "the" to ---said---.

Signed and Sealed this

Twenty-sixth Day of September, 1995

Attest:

BRUCE LEHMAN

*Attesting Officer*     *Commissioner of Patents and Trademarks*